(12) United States Patent
Chao et al.

(10) Patent No.: US 11,466,118 B2
(45) Date of Patent: Oct. 11, 2022

(54) CHAIN END HYDROXYL FUNCTIONALIZED BRANCHED POLYFARNESENES OBTAINED BY RADICAL POLYMERIZATION

(71) Applicant: FINA TECHNOLOGY, INC., Houston, TX (US)

(72) Inventors: Herbert Chao, Paoli, PA (US); Tomas Trnka, Kladno (CZ)

(73) Assignee: FINA TECHNOLOGY, INC., Houston, TX (US)

( * ) Notice: Subject to any disclaimer, the term of this patent is extended or adjusted under 35 U.S.C. 154(b) by 248 days.

(21) Appl. No.: 16/692,543

(22) Filed: Nov. 22, 2019

(65) Prior Publication Data

US 2021/0155745 A1 May 27, 2021

(51) Int. Cl.
| | | |
|---|---|---|
| C08F 136/20 | (2006.01) | |
| C08G 18/69 | (2006.01) | |
| C08F 136/22 | (2006.01) | |
| C08G 18/73 | (2006.01) | |
| C08G 18/24 | (2006.01) | |
| C08G 18/32 | (2006.01) | |

(52) U.S. Cl.
CPC ............ *C08G 18/69* (2013.01); *C08F 136/22* (2013.01); *C08G 18/246* (2013.01); *C08G 18/3206* (2013.01); *C08G 18/73* (2013.01); *C08F 2810/40* (2013.01)

(58) Field of Classification Search
CPC .................................................. C08F 136/22
See application file for complete search history.

(56) References Cited

U.S. PATENT DOCUMENTS

| | | | |
|---|---|---|---|
| 3,258,450 | A | 6/1966 | Aronoff et al. |
| 3,629,175 | A | 12/1971 | Moore et al. |
| 4,063,002 | A | 12/1977 | Wilson |
| 5,589,543 | A | 12/1996 | Yokelson et al. |
| 5,925,724 | A | 7/1999 | Cenens et al. |
| 6,060,560 | A | 5/2000 | St. Clair |
| 6,211,324 | B1 | 4/2001 | Haider et al. |
| 6,780,957 | B1 | 8/2004 | Haider et al. |
| 7,001,952 | B2 | 2/2006 | Faler et al. |
| 7,655,739 | B1 | 2/2010 | McPhee et al. |
| 7,687,121 | B2 | 3/2010 | Landon et al. |
| 8,257,805 | B2 | 9/2012 | Landon et al. |
| 8,580,361 | B2 | 11/2013 | Landon |
| 8,592,543 | B2 | 11/2013 | McPhee et al. |
| 8,597,741 | B2 | 12/2013 | Landon et al. |
| 9,040,630 | B2 | 5/2015 | McPhee |
| 9,850,329 | B2 | 12/2017 | Yoo et al. |
| 9,994,669 | B2 | 6/2018 | Tian et al. |
| 10,239,973 | B2* | 3/2019 | Yoo ...................... C08G 18/755 |
| 10,323,117 | B2* | 6/2019 | Tian ................... C08G 18/7671 |
| 10,336,839 | B2* | 7/2019 | Yoo ......................... C08F 36/22 |
| 10,544,241 | B2 | 1/2020 | Henning et al. |
| 2004/0158003 | A1 | 8/2004 | Ruckel et al. |
| 2006/0199922 | A1 | 9/2006 | Pawlow et al. |
| 2007/0173597 | A1 | 7/2007 | Williams et al. |
| 2007/0178256 | A1 | 8/2007 | Landon |
| 2011/0151154 | A1 | 6/2011 | Landon |
| 2012/0165474 | A1 | 6/2012 | McPhee et al. |
| 2013/0022404 | A1 | 1/2013 | Stinson |
| 2013/0078397 | A1 | 3/2013 | Chao et al. |
| 2013/0123379 | A1 | 5/2013 | Mcphee |
| 2014/0378570 | A1 | 12/2014 | Tabor et al. |
| 2015/0025193 | A1 | 1/2015 | Doolan et al. |
| 2015/0218428 | A1 | 8/2015 | Krishnan et al. |
| 2015/0284656 | A1 | 10/2015 | Uehara et al. |
| 2016/0272750 | A1 | 9/2016 | Voci et al. |
| 2016/0376386 | A1 | 12/2016 | Yoo et al. |
| 2017/0190829 | A1* | 7/2017 | Tian ...................... C08F 136/22 |
| 2018/0282524 | A1* | 10/2018 | Chao ....................... C08L 75/08 |
| 2019/0016847 | A1 | 1/2019 | Henning et al. |

FOREIGN PATENT DOCUMENTS

| | | |
|---|---|---|
| CA | 2888668 A1 | 9/2014 |
| CN | 1167735 C | 9/2004 |
| CN | 103052664 A | 4/2013 |
| CN | 104704090 A | 6/2015 |
| CN | 105121482 A | 12/2015 |
| EP | 1279687 A2 | 1/2003 |
| EP | 2601229 B1 | 6/2013 |
| EP | 2899255 A1 | 7/2015 |
| JP | S59227915 A | 12/1984 |

(Continued)

OTHER PUBLICATIONS

Japanese Notice of Reasons for Rejection for Japanese Application No. 2018-535140, dated Nov. 10, 2020 with translation, 5 pages.
Taiwan Office Action for Taiwan Application No. 105129517, dated Nov. 30, 2020 with partial translation, 5 pages.
Final Office Action for U.S. Appl. No. 16/068,619, dated Feb. 12, 2021, 20 pages.
Taiwan Office Action with Search Report for Taiwan Application No. 105129517, dated Apr. 23, 2020, 4 pages.
Chinese Office Action for Chinese Application No. 201680078219.0, dated Apr. 24, 2020, with translation, 15 pages.
Notice of Reasons for Rejection for Japanese Application No. 2018-535140, dated Apr. 22, 2020, with translation, 5 pages.
Bae et al., "A novel mechanism of exfoliation and physical properties of PU/Organoclay nanocomposites," 2013, pp. 3089-3095, vol. 129(6), Journal of Applied Polymer Science, DOI: 10.1002/app.38622.
Carrado et al., "Acid activation of bentonites and polymer-clay nanocomposites," Apr. 2009, pp. 111-116, vol. 5, Elements.

(Continued)

*Primary Examiner* — Michael L Leonard
(74) *Attorney, Agent, or Firm* — Albert Shung

(57) ABSTRACT

A terminal hydroxyl functionalized polyfarnesene is provided. The polyfarnesene has more than two terminal hydroxyl groups per molecule, on average, based on the number average molecular weight. The polyfarnesenes may be homopolymers or copolymers of farnesene. Also provided is a method of making these polyfarnesenes having more than two hydroxyl groups per molecule. A composition for making a polyurethane comprising a diisocyanate and the terminal hydroxyl functionalized polyfarnesene is also provided.

20 Claims, No Drawings

(56) References Cited

FOREIGN PATENT DOCUMENTS

| JP | S62012746 A | 1/1987 |
|---|---|---|
| JP | 2007291378 A | 11/2007 |
| JP | 2016037589 A | 3/2016 |
| KR | 20150135305 A | 12/2015 |
| WO | 2007089699 A2 | 8/2007 |
| WO | 2012018682 A1 | 2/2012 |
| WO | 2014142001 A1 | 9/2014 |
| WO | 2014157624 A1 | 10/2014 |

OTHER PUBLICATIONS

Chen et al., "Exfoliation of organo-clay in telechelic liquid polybutadiene rubber," 2005, Macromolecules, vol. 38(9), pp. 4030-4033.
Cray Valley Products for Urethane Elastomers Hydroxyl Terminated Functional Liquid Poly bd Resins, 24 pages (2011).
International Preliminary Report on Patentability for International Application No. PCT/US2016/046519, dated Jul. 10, 2018, 12 pages.
International Preliminary Report on Patentability for International Application No. PCT/US20188/024525, dated Oct. 8, 2019, 7 pages.
International Search Report and Written Opinion for International Application No. PCT/US2016/046519, dated May 17, 2017, 20 pages.
International Search Report and Written Opinion for International Application No. PCT/US2018/024525, dated Jul. 4, 2018, 13 pages.
Invitation to Pay Additional Fees for International Application No. PCT/US2016/046519, dated Nov. 11, 2016, 10 pages.
Non Final Office Action for U.S. Appl. No. 14/989,140, dated May 2, 2017, 15 pages.
Non Final Office Action for U.S. Appl. No. 15/477,699, dated Sep. 13, 2018, 36 pages.
Ruth et al., "Dispersion of nanoclays in urethane monomers," Polymer Preprints 2009, vol. 50(2), pp. 528, (Proceedings Published 2010 by the American Chemical Society).
Sun et al., "Rubber/exfoliated-clay nanocomposite gel: Direct exfoliation of montmorillonite by telechelic liquid rubber," 2004, pp. 1664-1666, vol. 49(15), Chinese Science Bulletin.
Wang et al., "Enhanced Exfoliation of Organoday in Partially End-Functionalized Non-Polar Polymer", Macromolecule Materials and Engineering, 2009, 294, pp. 190-195.
Zhu et al., "Studies on Polybutadiene / MMT Nanocomposites," China Academic Journal Electronic Publishing House, 2010, vol. 38(5), pp. 186-168.
Zhu et al., "Study on Clay Dispersion and Confinement in Polybutadiene/clay Nanocomposites", College of Chemistry and Chemical Engineering, 2011, vol. 62(5), pp. 273-276.
Non Final Office Action for U.S. Appl. No. 16/068,619, dated Jul. 7, 2020, 31 pages.
Chinese Office Action for Chinese Application No. 201680078219.0 dated Dec. 10, 2020 with partial translation, 4 pages.
Japanese Notice of Reasons for Rejection for Japanese Application No. 2018-535140, dated May 18, 2021 with translation, 8 pages.
Informal Translation of the Preliminary Office Action for Brazilian Application No. BR112018013738-3, dated Feb. 28, 2020, 5 pages.
Final Office Action for U.S. Appl. No. 16/068,619, dated Jan. 14, 2022, 13 pages.
Non Final Office Action for U.S. Appl. No. 16/068,619, dated Apr. 29, 2022, 8 pages.

\* cited by examiner

CHAIN END HYDROXYL FUNCTIONALIZED BRANCHED POLYFARNESENES OBTAINED BY RADICAL POLYMERIZATION

FIELD OF THE INVENTION

The invention relates to homopolymers and copolymers of farnesene having more than two terminal hydroxyl groups on average per molecule. The invention also relates to methods of making these materials and uses for them.

BACKGROUND OF THE INVENTION

Hydroxyl terminated polyfarnesenes having two or fewer terminal hydroxyl groups have been described in U.S. Pat. No. 9,994,669 B2, the disclosure of which is incorporated by reference herein for all purposes in its entirety. The polyfarnesenes in U.S. Pat. No. 9,994,669 B2 were obtained through anionic polymerization of farnesene, which yields linear molecules with relatively narrow molecular weight ranges. At the end of polymerization, the reactive chain ends were capped with either ethylene oxide or propylene oxide to obtain the hydroxyl functionalization. Since the molecules were linear, each molecular contained two or fewer terminal hydroxyl groups on average. While these are useful for reaction with isocyanates to form polyurethanes, the resulting polyurethanes are not crosslinked.

Polyfarnesene polymers are known to have significantly lower viscosity compared to that of polydienes of similar molecular weight. This lower viscosity is attributed to the long and tightly compacted side chains attached to the polyfarnesene main backbones. Similarly, terminal hydroxyl functionalized polyfarnesenes can have a lower viscosity than diene-based polyols having similar molecular weight and an equivalent amount of hydroxyl groups per gram. Polyfarnesenes are a desirable alternative to diene-based polyols for making polyurethanes, due to easier processing because of their lower viscosity compared to diene-based materials. In addition, since the farnesene monomer may be prepared without using petroleum, is it considered a "green" alternative.

However, until now, terminal hydroxyl functionalized polyfarnesene had been prepared such that each molecule had 2 or fewer terminal OH groups. Accordingly, there remains a need for farnesene-based polymers having more than two terminal OH groups per molecule, on average.

SUMMARY

According to a first aspect of the invention, a terminal hydroxyl functionalized polymeric composition is disclosed. The composition comprises polymeric molecules comprising farnesene as polymerized units in the polymeric molecules. The polymeric molecules have an average of more than two terminal hydroxyl functional groups per polymeric molecule based on the number-average molecular weight of the polymeric molecules.

According to a second aspect of the invention, method of preparing a terminal hydroxyl functionalized polymeric composition is disclosed. The method comprises the step of mixing at least one monomer comprising farnesene, a reaction vehicle comprising a C4-C8 alcohol, and a free radical initiator comprising hydrogen peroxide to form a reaction mixture in which the free radical initiator reacts with the at least one monomer to form the terminal hydroxyl functionalized polymeric composition. The terminal hydroxyl functionalized polymeric composition that is formed comprises polymeric molecules comprising the farnesene as polymerized units in the polymeric molecules, and an average of more than two terminal hydroxyl groups per polymeric molecule based on the number-average molecular weight of the polymeric molecules.

According to a third aspect of the invention, a composition for making a polyurethane comprising at least one terminal hydroxyl functionalized polymeric composition and at least one isocyanate-group containing compound is disclosed. The at least one terminal hydroxyl functionalized polymeric composition comprises polymeric molecules comprising farnesene as polymerized units in the polymeric molecules, and has an average of more than two terminal hydroxyl groups per polymeric molecule based on the number average molecular weight of the polymeric molecules. The at least one isocyanate-group containing compound has an isocyanate group functionality of at least two.

According to a fourth aspect of the invention, a method of preparing a polyurethane is disclosed. The method comprises the steps of:

a) Combining: i) a terminal hydroxyl functionalized polymeric composition comprising polymeric molecules comprising farnesene as polymerized units in the polymeric molecules and having an average of more than two terminal hydroxyl functional groups per polymeric molecule based on the number-average molecular weight of the polymeric molecules; with ii) one or more isocyanate-containing compounds having a isocyanate functionality of at least two, to form a reaction mixture.

b) Curing the reaction mixture to form the polyurethane.

DETAILED DESCRIPTION

According to various embodiments of the disclosed compositions and methods, a terminal hydroxyl functionalized polyfarnesene is provided. The polyfarnesene has more than two terminal hydroxyl groups per molecule, on average, based on the number average molecular weight. The polyfarnesenes may be homopolymers or copolymers of farnesene. Also provided is a method of making these polyfarnesenes having more than two hydroxyl groups per molecule.

A composition for making a polyurethane comprising a polyisocyanate and the terminal hydroxyl functionalized polyfarnesene is also provided. The composition for making the polyurethane may further include chain extenders, such as monomeric polyols and polyamines. Therefore, as used herein "polyurethane" refers to a polymer containing one or more urethane bonds and may also include one or more urea bonds. The polyurethanes that are made with these terminal hydroxyl functionalized polyfarnesenes are crosslinked, indicating that there are more than two terminal hydroxyl groups per each polyfarnesene molecule on average.

The terminal hydroxyl functionalized polyfarnesenes according to the disclosed methods and compositions exhibit lower viscosities compared to polydiene-based polyols, such as polybutadiene, of similar molecular weight. Therefore, terminal hydroxyl functionalized polyfarnesenes may be handled favorably in polyurethane formulations and applications without significant dilution with other components. In addition, the terminal hydroxyl functionalized polyfarnesenes can be combined with oligomers based on hydroxyl-terminated polybutadiene and polyisoprene to provide polyol mixtures that may be combined with one or more polyisocyanates to form the compositions for making the polyurethanes. The viscosity of the terminal hydroxyl functionalized polyfarnesenes may be controlled by copolymerization with other monomers, such as dienes and vinyl aromatics. Examples of such comonomers include butadiene, isoprene, and styrene. The resulting polyurethanes derived from polyfarnesene polyols have high hydrophobicity and are excellent in a variety of applications, such as insulating glass sealants, caulks, electric potting compounds, construction coating/sealants, water membranes, sponges, foams, adhesives, coatings, propellant binders, encapsulating compounds, as well as other rubber-fabricated materials. Furthermore, as noted above, these polyurethanes are crosslinked, which is an advantage in certain applications.

In this invention, hydroxyl-terminated polyfarnesene are prepared through radical polymerization using functionalized radical initiators in a reaction vehicle, such as a solvent or solvent mixture. The term "solvent" is not meant to limit the reaction vehicle to compounds or compositions that are capable of dissolving any or all of the reactants or products. The reaction vehicle may be capable of dissolving the farnesene monomer and any co-monomers, or it may not be. Likewise, the reaction vehicle may or may not be capable of dissolving the resulting polymerized composition. During the free-radical polymerization of farnesene, a very hydrophobic monomer, the reaction vehicle choice was found to be critical. For example, when using ispropanol to prepare hydroxyl-terminated polyfarnesene, only crosslinked gels were obtained. Employing aliphatic alcohols with carbon numbers higher than three as the reaction vehicle appeared to be essential. In contrast to farnesene-based polymers prepared by anionic polymerization, the chain end functionalized polymers prepared by the radical polymerization method disclosed herein have a functionality more than two. Namely, the radical polymerization of the present invention yields branched hydroxyl-terminated farnesene-based macromonomers, or branched hydroxyl-terminated farnesene-based polymers, which, after further curing react with isocyanates, polyisocyanates or anhydride adducted polybutadienes to generate thermosets.

Reaction Conditions:

The branched hydroxyl-terminated farnesene-based polymers disclosed herein may be prepared by a continuous reaction vehicle polymerization process wherein a free radical initiator, monomers, and a suitable reaction vehicle are continuously added to a reactor vessel to form a reaction mixture which is heated to a reaction temperature to form the desired terminal hydroxyl functionalized polymeric composition, which may be a homopolymer of farnesene or a copolymer of farnesene and at least one comonomer. Alternatively, the branched hydroxyl-terminated farnesene-based polymers may be prepared by a batch process in which all of the free radical initiator, monomer(s), and reaction vehicle are combined in the reactor together substantially simultaneously. Alternatively, the branched hydroxyl-terminated farnesene-based polymers may be prepared by a semi-batch process in which all of the free radical initiator and reaction vehicle are combined in the reactor together before a monomer feed is continuously metered into the reactor. Suitable reaction temperatures may be from 80° C. to 180° C., or from 90° C. to 170° C., or from 100° C. to 160° C., or from 110° C. to 150° C., or from 110° C. to 140° C., or from 110° C. to 130° C., or from 100° C. to 130° C., or from 110° C. to 130° C., or from 120° C. to 150° C. The reaction time may range from 1 to 10 hours or from 2 to 5 hours.

The reaction mixture may be optionally pressurized to a pressure from 0.1 to 1 MPa, such as 0.2 MPa. Nitrogen may be used to pressurize the reaction mixture. Other gasses such as are known and used in the art are also suitable.

The resulting branched hydroxyl-terminated farnesene-based polymers may be separated from the reaction vehicle using methods such as are known in used in the art. Drying or stripping under an inert atmosphere (e.g. nitrogen) at an elevated temperature such as 150° C. is a non-limiting example.

As mentioned above, the reaction may be carried out as a batch operation, or as a semi-batch operation or as a continuous operation.

Free Radical Initiator

According to aspects of the invention, the preferred free radical initiator is hydrogen peroxide, $H_2O_2$. Typically, the hydrogen peroxide is provided as an aqueous solution. Non-limiting examples of suitable concentrations of hydrogen peroxide in water are 10%, 15%, 25%, 30%, 35%, 50% and 75% by weight.

The molar ratio of the initiator, i.e. hydrogen peroxide to the total monomers, is a factor in determining the molecular weight (Mn and Mw) of the resulting hydroxyl-terminated farnesene-based polymers, and likewise affects the number of OH groups per molecule, since the hydroxyl groups originate from the hydrogen peroxide. The molar ratio of hydrogen peroxide to monomer may be from 1:1 to 1:100. The molar ratio of hydrogen peroxide to monomer may be from 1:4 to 1:84.

Reaction Vehicle

As noted above, the reaction vehicle selection is a critical element for forming the branched hydroxyl-terminated farnesene-based polymers having more than two hydroxyl groups per molecule based on the number average molecular weight of the farnesene-based polymers. Preferably, the reaction vehicle comprises, consists essentially or consists of a C4 to C8 alcohol, in particular an aliphatic alcohol having four to eight carbons per molecular or a combination of such alcohols. A C3 alcohol such as isopropanol, when used as the reaction vehicle, does not produce branched hydroxyl-terminated farnesene-based polymers that have more than two hydroxyl groups per molecule. A polyfarnesene made using isopropanol as the reaction vehicle produced a crosslinked material with a low conversion of the monomer under a variety of reaction conditions. Further, higher carbon alcohols (>C8) were also unsuccessful in preparing suitable polymers, since a well-defined polymer was not produced.

Suitable reaction vehicles include n-butanol, isobutanol, t-butyl alcohol, 3-methyl-1-butanol, isomers of pentanol, isomers of hexanol, isomers of heptanol, and isomers of octanol.

Following polymerization, the hydroxyl-terminated polymer may be hydrogenated to decrease the degree of unsaturation of the polymer to at most 50%, alternatively at most 10% (wherein the initial amount of unsaturation present in the polymer is considered to be 100%). Hydrogenation of the hydroxyl-terminated polymer will modify the glass transition 19 temperature (Tg) of the polymer and improve the thermostability and UV-stability of the polymer. Hydrogenation may be carried out by a variety of processes familiar to those of ordinary skill in the art including, but not limited to, hydrogenation in the presence of catalysts, such as Raney Nickel, noble metals, soluble transition metal catalysts, and titanium catalysts, for example. Degree of unsaturation is determined by analytical methods known in the art, such as iodine value.

Farnesene

Farnesene exists in isomer forms, such as α-farnesene ((3E,7E)-3,7,11-trimethyl-1,3,6,10-dodecatetraene) and β-farnesene (7,11-dimethyl-3-methylene-1,6,10-dodecatriene). As used in the specification and in the claims, "farnesene" or "-farnesene" means (E)-β-farnesene having the following structure:

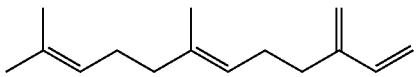

Additionally, it should be understood that "farnesene" or "β-farnesene" also means (E)-β-farnesene in which one or more hydrogen atoms have been replaced by another atom or group of atoms, i.e. substituted farnesene.

The farnesene monomer used to produce various embodiments of the resin according to the present invention may be prepared by chemical synthesis from petroleum resources, extracted from insects, such as Aphididae, or plants. Therefore, an advantage of the present invention is that the resin may be derived from a monomer obtained via a renewable resource. It is preferably prepared by culturing a microorganism using a carbon source derived from a saccharide. The farnesene resin according to the present invention may be efficiently prepared from farnesene monomer obtained via these sources.

The saccharide used may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

The cultured microorganism that consumes the carbon source may be any microorganism capable of producing farnesene through culturing. Examples thereof include eukaryotes, bacteria, and archaebacteria. Examples of eukaryotes include yeast and plants.

The microorganism may be a transformant obtained by introducing a foreign gene into a host microorganism. The foreign gene is not particularly limited, and it is preferably a foreign gene involved in the production of farnesene because it can improve the efficiency of producing farnesene.

In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

Comonomers:

Suitable comonomers that can optionally be combined with the farnesene to form the hydroxyl-terminated farnesene-based copolymers include, but are not limited to olefins, dienes, vinyl aromatics, and combinations thereof. Examples of suitable comonomers include, but are not limited to, butadiene and substituted butadienes, piperylene (1,3-pentadiene and isomers thereof), styrene, alpha-methyl styrene, isoamylene (β-isoamylene or trimethylethylene or 2-methyl-2-butene or 2-methylbut-2-ene), cyclopentene, 2-methyl styrene, 3-methyl styrene, 4-methyl styrene, 4-t-butyl styrene, 4-cyclohexyl styrene, 4-dodecyl styrene, 2,4-diisopropyl styrene, 2,4,6-trimethyl styrene, 2-ethyl-4-benzyl styrene, 4-(phenyl butyl)styrene, 1-vinyl naphthalene, 2-vinyl naphthalene, vinyl anthracene, 4-methoxy styrene, monochlorostyrene, dichlorostyrene, indene, methyl indene, isoprene, terpenes such as myrcene, pinene, and limonene, dipentene, pentene, isobutylene, 2-methyl-1-butene, 2-methyl-1-pentene, 2-methyl-2-pentene, 2,3-dimethyl-1-butene, 2,3-dimethyl-2-butene, 3,3-dimethyl-1-butene, and 3-methyl-2-pentene, and isomers thereof.

Molecular Weight and Molecular Weight Distribution

The weight (Mw) and number (Mn) average molecular weights of the polymers disclosed herein are measured using gel permeation chromatography (GPC) using polystyrene standards. The details of measuring the molecular weights are disclosed in the Examples. The hydroxyl-terminated farnesene-based polymers or copolymers as disclosed herein have molecular weight distributions (Mw/Mn) ranging from 1.5 to 4.0. The hydroxyl-terminated farnesene-based polymers or copolymers may have Mw/Mn values ranging from 2.4 to 2.5, or from 2.3 to 2.6, or from 2.2 to 2.7, or from 2.1 to 2.8, or from 2.0 to 2.9, or from 1.9 to 3.0, or from 1.8 to 3.1, or from 1.7 to 3.2, or from 1.6 to 3.3, or from 1.5 to 3.4, or from 1.5 to 3.5 or from 1.5 to 3.6 or from 2.5 to 3.0 or from 3.0 to 4.0.

The number average molecular weight of the hydroxyl-terminated farnesene-based polymers or copolymers may range from 1000 Dalton to 15,000 Daltons, as measured by GPC. The number average molecular weight may be 1500 Da, or 2000 Da, or 2500 Da, or 3000 Da, or 3500 Da, or 4000 Da, or 4500 Da, or 5000 Da, or 5500 Da, or 6000 Da, or 6500 Da, or 7000 Da, or 7500 Da, or 8000 Da, or 8500 Da, or 9000 Da, or 9500 Da, or 10000 Da, or 10500 Da, or 11000 Da, or 11500 Da, or 12000 Da, or 12500 Da, or 13000 Da, or 13500 Da, or 14000 Da, or 14500 Da, or 15000 Da. The Mn of the hydroxyl-terminated farnesene-based polymers or copolymers may range from 1500 to 14,000 Da, 3000 to 13,000 Da, 5000 to 15,000 Da, 1000 to 11,000 Da, or from 4000 to 15,000 Da.

The weight average molecular weights may range from 1800 Da to 52500 Da as measured by GPC using polystyrene standards. The weight average molecular weight may be 1900 Da, or 2000 Da, or 2500 Da, or 3000 Da, or 3500 Da, or 4000 Da, or 4500 Da, or 5000 Da, or 5500 Da, or 6000 Da, or 6500 Da, or 7000 Da, or 7500 Da, or 8000 Da, or 8500 Da, or 900 Da, or 9500 Da, or 10000 Da, or 10500 Da, or 11000 Da, or 11500 Da, or 12000 Da, or 12500 Da, or 13000 Da, or 13500 Da, or 14000 Da, or 14500 Da, or 15000 Da, or 15500 Da, or 16000 Da, or 16500 Da, or 17000 Da, or 17500 Da, or 18000 Da, or 18500 Da, or 19000 Da, or 19500 Da, or 20000 Da, or 20500 Da, or 21000 Da, or 21500 Da, or 22000 Da, or 22500 Da, or 23000 Da, or 23500 Da, or 24000 Da, or 24500 Da, or 25000 Da, or 26000 Da, or 26500 Da, or 27000 Da, or 27500 Da, or 28000 Da, or 28500 Da, or 29000 Da, or 29500 Da, or 30000 Da, or 30500 Da, or 31000 Da, or 31500 Da, or 32000 Da, or 32500 Da, or 33000 Da, or 33500 Da, or 34000 Da, or 34500 Da, or 35000 Da, or 35500, or 36000, or 36500 Da, or 37000 Da, or 37500 Da, or 38000 Da, or 38500 Da, or 39000 Da, or 39500 Da, or 40000 Da, or 40500 Da, or 41000 Da, or 41500 Da, or 42000 Da, or 42500 Da, or 43000 Da, or 43500 Da, or 44000 Da, or 44500 Da, or 45000 Da, or 45500, or 46000, or 46500 Da, or 47000 Da, or 47500 Da, or 48000 Da, or 48500 Da, or 49000 Da, or 49500, or 50000 Da. The weight average molecular weight of these polymers may be in a range between 9000 to 39,000 Da, 10,000 to 28,000 Da, 10,000 to 50,000 Da, 26,000 to 50,000 Da, 100 to 30,000 Da, or 6000 to 36,000 Da.

Mmol Hydroxyl Groups Per Gram Polymer

The number of mmol of hydroxyl groups per gram of the hydroxyl-terminated farnesene-based polymers or copolymers as disclosed herein may range from 0.1 mmol/gram to 10 mmol/gram. The number of mmol of hydroxyl groups per gram of the hydroxyl-terminated farnesene-based polymers or copolymers may be 0.1 or 0.2 or 0.3 or 0.4 or 0.5 or 0.6 or 0.7 or 0.8 or 0.9 or 1.0 or 0.1 or 0.2 or 0.3 or 0.4 or 0.5 or 0.6 or 0.7 or 0.8 or 0.9 or 1.0 or 0.1 or 0.2 or 0.3 or 0.4 or 0.5 or 0.6 or 0.7 or 0.8 or 0.9 or 1.0 or 1.1 or 1.2 or 1.3 or 1.4 or 1.5 or 1.6 or 1.7 or 1.8 or 1.9 or 2.1 or 2.1 or 2.2 or 2.3 or 2.4 or 2.5 or 2.6 or 2.7 or 2.8 or 2.9 or 3.0 or 3.1 or 3.2 or 3.3 or 3.4 or 3.5 or 3.6 or 3.7 or 3.8 or 3.9 or 4.0 or 4.1 or 4.2 or 4.3 or 4.4 or 4.5 or 4.6 or 4.7 or 4.8 or 4.9 or 5.0 or 5.1 or 5.2 or 5.3 or 5.4 or 5.5 or 5.6 or 5.7 or 5.8 or 5.9 or 6.0 or 6.1 or 6.2 or 6.3 or 6.4 or 6.5 or 6.6 or 6.7 or 6.8 or 6.9 or 7.0 or 7.1 or 7.2 or 7.3 or 7.4 or 7.5 or 7.6 or 7.7 or 7.8 or 7.9 or 8.0 or 8.1 or 8.2 or 8.3 or 8.4 or 8.5 or 8.6 or 8.7 or 8.8 or 8.9 or 9.0 or 9.1 or 9.2 or 9.3 or 9.4 or 9.5 or 9.6 or 9.7 or 9.8 or 9.9 or 10.0. The mmol of hydroxyl groups per gram of the hydroxyl-terminated farnesene-based polymers or copolymers may range from 0.5 to 3, 1 to 1.5, 0.3 to 7, 0.2 to 5, 0.5 to 8, or 0.9 to 9 mmol/gram.

Average Number of Terminal Hydroxyl Groups Per Farnesene-Based Polymeric Molecule or Per Mole of Farnesene-Based Polymer The number of moles of OH per mole of farnesene-based polymers, i.e. the number of OH groups per polymeric molecule, is more than two, since the polymers are branched. This number is determined from the number of mmol OH groups per gram of farnesene-based polymer as measured by the titration method detailed in the Examples and is based on the number average molecular weight as measured by GPC with polystyrene standards. For avoidance of doubt, the moles of terminal OH per mole of farnesene-based polymer are calculated as follows:

$$\frac{mmol \frac{OH}{gm} \text{polymer} \times Mn}{1000} = \text{mols OH per mole of polymeric molecules}$$

The number of OH groups per polymeric molecule, based on the number average molecular weight of the farnesene-based polymers may therefore be at least 2.1 or 2.2 or 2.3 or 2.4 or 2.5 or 2.6 or 2.7 or 2.8 or 2.9 or 3.0 or 3.1 or 3.2 or 3.3 or 3.4 or 3.5 or 3.6 or 3.7 or 3.8 or 3.9 or 4.0 or 4.1 or 4.2 or 4.3 or 4.4 or 4.5 or 4.6 or 4.7 or 4.8 or 4.9 or 5.0 or 5.1 or 5.2 or 5.3 or 5.4 or 5.5 or 5.6 or 5.7 or 5.8 or 5.9 or 6.9 or 6.1 or 6.2 or 6.3 or 6.4 or 6.5 or 6.6 or 6.7 or 6.8 or 6.9 or 7.0 or 7.1 or 7.2 or 7.3 or 7.4 or 7.5 or 7.6 or 7.7 or 7.8 or 7.9 or 8.0 or 8.1 or 8.2 or 8.3 or 8.4 or 8.5 or 8.6 or 8.7 or 8.8 or 8.9 or 9.0 or 9.1 or 9.2 or 9.3 or 9.4 or 9.5 or 9.6 or 9.7 or 9.8 or 9.9 or 10.0 average number of hydroxyl groups per hydroxyl-terminated farnesene-based polymeric molecule. The average 19 number of hydroxyl groups per hydroxyl-terminated farnesene-based polymeric molecule may be from 2.1 to 10, 3 to 9, 2.1 to 7, 2.1 to 4, 3 to 8, or 2.1 to 5.

Viscosity

The viscosity of the hydroxyl-terminated farnesene-based polymers or copolymers may range from 1000 cP to 100,000 CP. The viscosity is measured with a Brookfield viscometer using spindle 21 at a speed from 20 to 90 RPM. The viscosity may be 5000 cP, or 9000 cP, or 15,000 cP, or 20,000 cP, or 30,000 cP, or 40,000 cP, or 50,000 cP, or 70,000 cP, or 85,000 cP, or 100,000 cp. The viscosity may be in a range from 1000 to 50,000 cP, 30,000 to 100,000 cP, 9000 to 30,000 cP, or 15,000 to 85,000 cP. The viscosities as measured and reported herein are measured at 25° C.

Polyurethanes Prepared from the Hydroxyl-Terminated Farnesene-Based Polymers or
Copolymers The hydroxyl-terminated farnesene-based polymers or copolymers of the present invention are useful in polyurethanes, which may be prepared by a reaction between the hydroxyl-terminated farnesene-based polymers or copolymers and isocyanates. In addition, chain extenders, usually diols or polyols, may also be included in the reaction to form the polyurethanes. Prepolymers may also be formed.

According to one embodiment, a composition is provided for making a polyurethane. The composition comprises the hydroxyl-terminated farnesene-based polymers or copolymers disclosed herein, optionally one or more other polyols, one or more isocyanate-group (NCO) containing compounds having an isocyanate group functionality of at least two, and optionally one or more chain extenders. The chain extender may include one or more monomeric polyols and/or polyamines. The composition may also comprise additional polyols, such as a polyol of a homopolymer or copolymer of a polydiene. The NCO/OH ratio of the composition may be about 2:1 to 1:2. Typically, for making polyurethane the NCO/OH may be kept at about 1.03. Much larger NCO/OH ratios are used for making prepolymers, and much smaller NCO/OH ratios are used for making hydroxyl terminated polyurethane oligomers.

According to another embodiment, a method of preparing a polyurethane is provided comprising combining the hydroxyl-terminated farnesene-based polymers or copolymers disclosed herein with optionally one or more other polyols. The hydroxyl-terminated farnesene-based polymer or copolymer composition are combined with one or more isocyanate-containing compounds having a isocyanate functionality of at least two, and optionally, a chain extender, to form a mixture and curing the mixture.

The molecular weight of each of the one or more chain extenders may be about 50 to 700. As understood by those of skill in the art, the type and amount of chain extender will affect the elastomeric properties of the polyurethane, such as tensile strength, elongation, and tear resistance values. When the compositions as described herein react to form a polyurethane, the chain extenders contribute to the hard segment of the polyurethane that serve as physical cross-links between the amorphous soft segment domains. The hard segments, which are formed by the reaction between an isocyanate group and either the hydroxyl or amine group of the chain extenders, inhibit plastic flow of softer segments of the polyurethane provided y the long chain polyols. The choice and amount of chain extender may also affect flexural, heat, and chemical resistance properties of the polyurethane. The chain extenders may include, but are not limited to 1,4-butanediol, 1,6-hexanediol, ethylene glycol, 2-ethyl-1,3-hexanediol (EHD), 2-butyl-2-ethyl-1,3-propanediol (BEPQ), 2,2,4-trimethyl-1,3-pentanediol (TMPD), 2,4-deithyl-1,5-pentanediol (PD-9), N,N-diisopropanol aniline, dimethylolpropionic acid, hydroquinone dihydroxyethyl ether (HQEE), diethylene glycol, propylene glycol, trimethylolpropane, glycerol, diethyltoluenediamine (DE-TDA), 4,4'-methylene bis(2-chloroaniline) (MBCA), ethylenediamine (EDA), dimethylthiotoluene-diamine (DMTTDA), 4,4'-methylenedianiline (MDA), complex of methylenediamine with NaCl (MDA complex), trimethyleneglycol di-p-aminobenzoate (TMGDAB), 4,4'-methylene-bis(3-chloro-2,6-diethylaniline) (M-CDEA), N,N'-bis(sec-butyl)methylene-dianiline (SBMDA), and mixtures thereof.

The one or more isocyanate-group containing compounds having a functionality of at least two may exhibit several or all of the following characteristics: bulk, symmetry around the isocyanate functional groups, rigid, aromatic, crystalline and high purity. The one or more isocyanate-group containing compounds having a functionality of at least two include but are not limited to, 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, and combinations thereof.

The physical properties of the polyurethane, such as viscosity, may be tailored depending on the desired application for the polyurethane by selection of the molecular weight hydroxyl terminated polyfarnesenes. If the optional polyols are included, the ratio of the hydroxyl terminated polyfarnesenes to the polyols in the compositions described herein.

The additional polyols that may optionally be included in the reaction mixture with the hydroxyl terminated polyfarnesene include, but are not limited to, poly(oxypropylene)glycol, poly(oxyethylene)glycol, poly(oxypropylene-oxyethylene)glycol, poly(pxytetramethylene)glycol, poly(oxybutylene)glycol, poly(caprolactone)glycol, poly(ethyleneadipate)glycol, poly(butyleneadipate)glycol, aromatic polyester glycols, polybutadiene polyol, hydrogenated polybutadiene polyol, polyisoprene polyol, hydrogenated polyisoprene polyol, and mixtures thereof.

According to yet another embodiment, a polyurethane is provided prepared according to the methods disclosed herein. Because the hydroxyl terminated polyfarnesenes disclosed herein comprise more than two terminal hydroxyl groups per molecule, the polyurethane is a thermoset. An elastomeric product is also provided comprising the polyurethane that may be in the form of a sealant, a coating, a caulk, an electric potting compound, a membrane, a sponge, a foam, an adhesives, and a propellant binder.

The polyurethanes made according to the methods disclosed herein may be manufactured by a batch procedure or a continuous procedure. The mixing of the reactants can be accomplished by any of the procedures and apparatus conventional in the art. The individual components are urethane grade and, as such, have low moisture content or are rendered substantially free from the presence of water using conventional procedures, for example, by azeotropic distillation, or by heating under reduced pressure at a temperature in excess of the boiling point of water at the pressure employed. The later procedure is desirable to accomplish degassing of the components.

Preparation of polyurethanes according to the various embodiments disclosed herein may be achieved by procedures conventional in the art for synthesis of polyurethanes. Such procedures include the casting procedure in which the reactants (one or more polyols, one or more polyisocyanates, and one or more optional chain extenders) are mixed in the liquid state, either by the one-shot route or the two-step route, also known as the prepolymer technique, and then, the reacting mixture is fabricated into its final form by an appropriate technique such as casting or molding, while the reaction continues by chain extension and/or cross-linking. Final cure is typically achieved by a hot air post-cure for up to twenty-four hours at 25° C. to about 200° C. In general, the reaction of the components limits the subsequent pot life to several minutes, and subsequent casting or molding immediately thereafter. Vacuum degassing may also be used to prepare castings which are bubble free. In the one-shot route, the polyurethane is made by combining all of the components of the composition for making a polyurethane as described herein generally simultaneously into a common reaction vessel. One-shot systems offer the advantages of versatility, simplicity, and low cost fabrication techniques for preparing urethanes having a wide range of physical properties. Such applications as caulks, sealants, elastomers and foams are possible via these systems.

Two-shot systems are based upon the intermediate formulation of a prepolymer which can be further chain-extended with additional polyols and polyamines to form the final polyurethane. These systems may provide higher performance urethanes and have the advantages of lowering the overall toxicity of the system.

In the prepolymer procedure, the one or more isocyanate-group containing compounds are first reacted with the one or more polyols to form a prepolymer. The one or more polyols include at least one farnesene-based polyol. Therefore, the resulting prepolymer is a polymer having a chain derived from farnesene monomer and terminal ends functionalized with one or more isocyanate groups. Additional isocyanate-group containing compounds, polyols, and chain extenders may then be added to the prepolymer to complete formation of the polyurethane.

The compositions for making a polyurethane, in addition to including one or more polyols, isocyanate-containing compounds, and chain extenders may also include reinforcing additives, asphalt, and process oils to alter the physical characteristics of the polyurethane composition and/or reduce costs.

Plasticizers may be included as extenders that also increase the softness and flexibility of the cured material in various embodiments of the disclosed methods and compositions. One or more plasticizers may be selected from the group consisting of vegetable oil, mineral oil, soybean oil, terpene resins, aromatic esters (e.g. dioctyl phthalate, diundecyl phthalate, tricresyl phosphate, and triisononyl mellitate), linear esters (e.g. di-tridecyl adipate), chlorinated Paraffin, aromatic and napthenic process oils, alkyl naphthalenes, and low molecular weight polyisoprene, polybutadiene, or polybutylene resins. The amounts of plasticizer employed in the invention composition can vary from 0 to about 500 phr (per hundred parts of polyurethane), between about 0 to about 100 phr, and most between about 0 and about 60 phr. The term phr is understood to mean that the additives are present as a weight percent relative to the total amount of polymer in the composition, i.e., without consideration for any other additive, fillers, etc.

Because of their hydrocarbon backbones, the polyurethanes made according to the methods and compositions described herein are compatible with conventional hydrocarbon oils, chlorinated oils, asphalts and other related low cost extending materials. The quantity of asphalt or process oil which may be incorporated depends on the type of oils, the amount of isocyanate groups present, and the type of fillers, if present. Cured polyurethanes may be formulated which incorporate in excess of 100 parts extending material per 100 parts of polyurethane and do not "bleed" oil from the final product. The cured polyurethanes may also exhibit a moderate decrease in tensile strength and modulus and improved elongation with the addition of an extending material. Oil extension may also improve hydrolytic stability, control of premix viscosities, pot life, gel time, cure time, and the ability to attain higher filler loading. The use of materials such as chlorinated waxes and oils also provides fire retardant properties to the finished product.

Suitable fillers include, but are not limited to, carbon black, calcium carbonate, clays, talcs, zinc oxide, titanium dioxide, silica and the like. Calcium carbonates are relatively soft and may be used at rather high levels to enhance the extrusion properties of the polyurethane compositions described herein. Elastomers prepared using calcium carbonates are suitable for many caulk and sealant applications where high elongation and moderate tensile properties are required. Clays may provide a moderate degree of reinforcement, fair abrasion resistance, but a relatively high stiffening effect. Clays are used as fillers in stocks requiring hardness and high modulus; e.g., shoe soles and heels, mats, and floor tiles. Zinc oxide may also provide resilience and heat conductivity, but its use as a reinforcing filler may be limited due to high density and cost. Zinc oxide may be effectively employed as a reinforcing filler in conjunction with carbon black to increase tensile, modulus, tear, and hardness, and abrasion resistance. It is important to note that at a constant carbon black level, increasing the concentration of zinc oxide may decrease the workable pot life of the compositions described herein after the isocyanate component is added; i.e., gelation occurs more rapidly. Silicas contribute a greater increase in tensile strength than other non-carbon black fillers. Silicas also have a profound stiffening effect on the compositions described herein. The amount of filler usually is in the range of 0 to about 800 phr, depending on the type of filler used and on the application for which the formulation is intended. Preferred fillers are silica and titanium dioxide. The filler should be thoroughly dried in order that adsorbed moisture will not interfere with the reaction between the isocyanate-containing compounds and the hydroxyl groups on the polyfarnesene and the optional one or more polyols.

Stabilizers known in the art may also be incorporated into the composition. For example, adhesive formulations that utilize the polyurethanes of the disclosed methods and compositions may include stabilizers for protection during the life of the sealant or adhesive against, for example, oxygen, ozone and ultra-violet radiation. The stabilizers may also prevent thermo-oxidative degradation during elevated temperature processing. Antioxidants and UV inhibitors which interfere with the urethane curing reaction should be avoided. Preferred antioxidants are sterically hindered phenolic compounds, like butylated hydroxy toluene. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 phr. However depending on the intended use of the polyurethane, the stabilizer concentration may be as much as about 10 phr.

The polyurethane according to the embodiments of the disclosed methods and compositions may be cured by procedures known by those having ordinary skill in the art for the curing of isocyanate terminated polymers. Curing mechanisms include, but are not limited to, the use of heat, moisture, blocked amines, oxazolidines, epoxies, triisocyanurate ring formation, allophonate and biruet crosslinking and the like. Unfilled urethane systems may be cured at ambient temperatures, but cure rates may be accelerated by using either typical urethane catalysts and/or elevated temperatures. Catalysts include, but are not limited to, dibutyltin dilaurate and 1, 4-diazo [2.2.2] bicyclooctane. The amount and type of catalyst that may be included in the compositions described herein may be selected based on the desired cure rate. Depending upon the curing technology employed, the resulting polyurethanes may be either a thermoset polyurethane or a higher melt temperature thermoplastic polyurethane once curing is accomplished. The polyfarnesenes as disclosed herein will produce only thermosets.

The polyurethanes obtained according to the various embodiments of the disclosed methods and compositions exhibit excellent chemical and physical properties.

Other Uses of the Hydroxyl-Terminated Farnesene-Based Polymers:

The hydroxyl groups on these hydroxyl-terminated farnesene-based polymers are capable of other reactions typical for alcohols. They may react with halogens (e.g. chlorine) and anhydrides of acids (e.g. maleic anhydride). They may be esterified or silylated. They can also react with other functionalized macromonomers or polymers, such as polyesters, polyamides, polyurethanes, epoxy resins and with a variety of others.

The hydroxyl-terminated farnesene-based polymers or copolymers of the present invention may be used to produce polyesters. Polyesters may be prepared by a reaction between the hydroxyl-terminated farnesene-based polymers or copolymers and anhydride adducted polybytadiene or polyisoprene. Non-limiting examples of such materials include maleinized polybutadiene-styrene polymers (such as Ricon® 184/MA from Cray Valley), or maleinized polybutadiene (such as Ricon® 131/MA from Cray Valley).

Certain exemplary aspects of the invention are as follows:

Aspect 1: A terminal hydroxyl functionalized polymeric composition, comprising polymeric molecules comprising farnesene as polymerized units in the polymeric molecules, and having an average of more than two terminal hydroxyl functional groups per polymeric molecule based on the number-average molecular weight of the polymeric molecules.

Aspect 2: The terminal hydroxyl functionalized polymeric composition according to Aspect 1, wherein the polymeric molecules have an average of at least 2.1 terminal hydroxyl functional groups per polymeric molecule based on the number average molecular weight of the polymeric molecules.

Aspect 3: The terminal hydroxyl functionalized polymeric composition according to either of Aspects 1 or 2, wherein the polymeric molecules have an average of at least 3 terminal hydroxyl functional groups per polymeric molecule based on the number average molecular weight of the polymeric molecules.

Aspect 4: The terminal hydroxyl functionalized polymeric composition according to any of Aspects 1-3, wherein the polymeric molecules comprise an average of between 2.1 and 5 terminal hydroxyl functional groups per polymeric molecule of the polymeric molecules Aspect 5: The terminal hydroxyl functionalized polymeric composition according to any of Aspects 1-4, wherein the polymeric molecules further comprise, as polymerized units, at least one comonomer selected from the group consisting of olefins, dienes, vinyl aromatics, and combinations thereof.

Aspect 6: The terminal hydroxyl functionalized polymeric composition according to any of Aspects 1-5, wherein the polymeric molecules further comprise, as polymerized units, at least one comonomer selected from the group consisting of butadiene; isoprene; a-methyl styrene; styrene; 2,3-dimethyl butadiene; 1,3-pentadiene; 2-methyl-1,3-pentadiene; 1,3-hexadiene; 1,3-cyclohexadiene; 2 methylstyrene; 3-methylstyrene; 4-methylstyrene; 4-propyl styrene;

alkyl(meth)acrylate monomers; ethylene; vinyl aromatics; fumarates; maleates; vinyl esters; acrylonitriles, and mixtures thereof.

Aspect 7: The terminal hydroxyl functionalized compound according to any of Aspects 1-6, wherein the number average molecular weight of the polymeric molecules is from 1000 to 100,000 Da.

Aspect 8: The terminal hydroxyl functionalized compound according to any of Aspects 1-7, wherein the number average molecular weight of the polymeric molecules is from 100 to 15,000 Da.

Aspect 9: The terminal hydroxyl functionalized compound according to any of Aspects 1-8, wherein the polydispersity index (Mw/Mn) of the polymeric molecules is from 1.5 to 4.

Aspect 10: A method of preparing a terminal hydroxyl functionalized polymeric composition, the method comprising:

a) mixing at least one monomer comprising farnesene, a reaction vehicle comprising a C4-C8 alcohol, and a free radical initiator comprising hydrogen peroxide to form a reaction mixture in which the free radical initiator reacts with the at least one monomer to form the terminal hydroxyl functionalized polymeric composition;

wherein the terminal hydroxyl functionalized polymeric composition comprises:

polymeric molecules comprising the farnesene as polymerized units in the polymeric molecules, and an average of more than two terminal hydroxyl groups per polymeric molecule based on the number-average molecular weight of the polymeric molecules.

Aspect 11: The method according to Aspect 1Q, wherein step a) further comprises heating the reaction mixture to a temperature of 110° C. to 130° C.

Aspect 12: The method according to either of Aspects 10 or 11, wherein step a) further comprises pressurizing the reaction mixture with 0.1 to 1 MPa nitrogen.

Aspect 13: The method according to any of Aspects 10-12, wherein a molar ratio of monomer to hydrogen peroxide is from 1:1 to 100:1.

Aspect 14: The method according to any of Aspects 10-13, wherein a molar ratio of monomer to hydrogen peroxide is from 1:4 to 1:84.

Aspect 15: The method according to any of Aspects 10-14, wherein the reaction vehicle comprises n-butanol.

Aspect 16: The method according to any of Aspects 10-15, wherein the reaction vehicle comprises 3-methyl-1-butanol.

Aspect 17: The method according to any of Aspects 10-16, wherein the terminal hydroxyl functionalized polymeric composition has an average of at least 2.1 terminal hydroxyl groups per polymeric molecule based on the number average molecular weight of the polymeric molecules.

Aspect 18: The method according to any of Aspects 10-17, wherein the terminal hydroxyl functionalized polymeric composition has an average of at least 3 terminal hydroxyl groups per polymeric molecule based on the number average molecular weight of the polymeric molecules.

Aspect 19: A composition for making a polyurethane comprising at least one terminal hydroxyl functionalized polymeric composition and at least one isocyanate-group containing compound, wherein the at least one terminal hydroxyl functionalized polymeric composition comprises polymeric molecules comprising farnesene as polymerized units in the polymeric molecules, and has an average of more than two terminal hydroxyl groups per polymeric molecule based on the number average molecular weight of the polymeric molecules;

and wherein the at least one isocyanate-group containing compound has an isocyanate group functionality of at least two.

Aspect 20: The composition according to Aspect 19, wherein the polymeric molecules have an average of at least 2.1 terminal hydroxyl functional groups per polymeric molecule based on the number average molecular weight of the polymeric molecules.

Aspect 21: The composition according to either of Aspects 19 or 20, wherein the polymeric molecules have an average of at least 3 terminal hydroxyl functional groups per polymeric molecule based on the number average molecular weight of the polymeric molecules.

Aspect 22: The composition according to any of Aspects 19-21, wherein the polymeric molecules have an average of between 2.1 and 5 terminal hydroxyl functional groups per polymeric molecule based on the number average molecular weight of the polymeric molecules.

Aspect 23: The composition according to any of Aspects 19-22, wherein the polymeric molecules further comprise, as polymerized units, at least one comonomer selected from the group consisting of olefins, dienes, vinyl aromatics, and combinations thereof.

Aspect 24: The composition according to any of Aspects 19-23, wherein the polymeric molecules further comprise, as polymerized units, at least one comonomer selected from the group consisting of butadiene; isoprene; a-methyl styrene; styrene; 2,3-dimethyl butadiene; 1,3-pentadiene; 2-methyl-1,3-pentadiene; 1,3-hexadiene; 1,3-cyclohexadiene; 2 methylstyrene; 3-methylstyrene; 4-methylstyrene; 4-propyl styrene; alkyl(meth)acrylate monomers; ethylene; vinyl aromatics; fumarates; maleates; vinyl esters; acrylonitriles, and mixtures thereof.

Aspect 25: The composition according to any of Aspects 19-24, wherein the number average molecular weight of the polymeric molecules is from 1000 to 100,000 Da.

Aspect 26: The composition according to any of Aspects 19-25, wherein the number average molecular weight of the polymeric molecules is from 1000 to 15,000 Da.

Aspect 27: The composition according to any of Aspects 19-26, wherein the polydispersity index (Mw/Mn) of the polymeric molecules is from 1.5 to 4.

Aspect 28: The composition according to any of Aspects 19-27, further comprising at least one chain extender.

Aspect 29: The composition according to Aspect 28, wherein the at least one chain extender is selected from the group consisting of monomeric polyols and polyamines.

Aspect 30: The composition according to either of Aspects 28 or 29, wherein the at least one chain extender is selected from the group consisting of 1,4-butanediol, 1,6-hexanediol, ethylene glycol, 2-ethyl-1,3-hexanediol (EHD), 2-butyl-2-ethyl-1,3-propanediol (3EPG), 2,2,4-trimethyl-1,3-pentanediol (TMPD), 2,4-deithyl-1,5-pentanediol (PD-9), N,N-diisopropanol aniline, dimethylolpropionic acid, hydroquinone dihydroxyethyl ether (HQEE), diethylene glycol, propylene glycol, trimethylolpropane, glycerol, diethyltoluenediamine (DETDA), 4,4'-methylene bis(2-chloroaniline) (MBCA), ethylenediamine (EDA), dimethylthiotoluene-diamine (DMTTDA), 4,4'-methylenedianiline (MDA), complex of methylenediamine with NaCl (MDA complex), trimethyleneglycol di-p-aminobenzoate (TMDAB), 4,4'- methylene-bis(3-chloro-2,6-diethylaniline) (M-CDEA), N,N'-bis(sec-butyl)methylene-dianiline (SBMDA), and mixtures thereof.

Aspect 31: The composition according to any of Aspects 19-30, having an NCO/OH ratio of about 2:1 to 1:2.

Aspect 32: The composition according to any of Aspects 19-31, wherein the one or more isocyanate-group containing compounds are selected from the group consisting of 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, and mixtures thereof.

Aspect 33: A method of preparing a polyurethane, the method comprising the steps of:
a) combining:
 i) a terminal hydroxyl functionalized polymeric composition comprising polymeric molecules comprising farnesene as polymerized units in the polymeric molecules and having an average of more than two terminal hydroxyl functional groups per polymeric molecule based on the number-average molecular weight of the polymeric molecules; with
 ii) one or more isocyanate-containing compounds having a isocyanate functionality of at least two,
 to form a reaction mixture; and
b) curing the reaction mixture to form the polyurethane.

Aspect 34: The method according to Aspect 33, wherein step a) further comprises combining the terminal hydroxyl functionalized polymeric composition and the one or more isocyanate-containing compounds with iii) at least one chain extender to form the reaction mixture.

Aspect 35: The method according to either of Aspects 33 or 34, wherein the chain extender is selected from the group consisting of monomeric polyols and polyamines.

Aspect 36: The method according to any of Aspects 33-35, wherein the chain extender is selected from the group consisting of 1,4-butanediol, 1,6-hexanediol, ethylene glycol, 2-ethyl-1,3-hexanediol (EHD), 2-butyl-2-ethyl-1,3-propanediol (BEPG), 2,2,4-trimethyl-1,3-pentanediol (TMPD), 2,4-deithyl-1,5-pentanediol (PD-9), N,N-diisopropanol aniline, dimethylolpropionic acid, hydroquinone dihydroxyethyl ether (HQEE), diethylene glycol, propylene glycol, trimethylolpropane, glycerol, diethyltoluenediamine (DETDA), 4,4'-methylene bis(2-chloroaniline) (MBCA), ethylenediamine (EDA), dimethylthiotoluene-diamine (DMTTDA), 4,4'-methylenedianiline (MDA), complex of methylenediamine with NaC (MDA complex), trimethyleneglycol di-p-aminobenzoate (TMGDAB), 4,4'-methylene-bis(3-chloro-2,6-diethylaniline) (M-CDEA), N,N'-bis(sec-butyl)methylene-dianiline (SBMDA), and mixtures thereof.

Aspect 37: A polyurethane prepared according to the method of any of Aspects 33-36.

Aspect 38: An elastomeric product comprising the polyurethane of Aspect 37.

Aspect 39: The elastomeric product of Aspect 38, wherein the product is in the form of a sealant, a coating, a caulk, an electric potting compound, a membrane, a sponge, a foam, an adhesive, or a propellant binder.

EXAMPLES

Embodiments of the disclosed methods and compositions are further described using the following non-limiting examples.

General Methods:

The hydroxyl number of compounds with hydroxyl groups may be determined by acetylating the hydroxyl groups present with an excess of acetic anhydride/pyridine reagent. The remaining unreacted acetic anhydride is converted to acetic acid and then titrated with alcoholic potassium hydroxide. The hydroxyl value of the sample is then back calculated. A correction for acid value is required for the calculation. The hydroxyl number is defined as the milligrams of potassium hydroxide equivalent to the hydroxyl content per gram of sample (mg KOH/g sample). The following procedure was used to analyze the hydroxyl value of polyfarnesene polyols disclosed herein in mmol OH/gram polyol, also referred to as meq/g.

Apparatus
1. Analytical balance-capable of weight 0.1 mg
2. 250 ml Erlenmeyer flasks
3. Oven with constant temperature-capable of maintaining 60±1° C.
4. Amber bottles-1 liter and 0.5 liter with polyethylene lined lid
5. Timer
6. Stirrer and PTFE stirring bars
7. 10 ml and 25 ml pipette and bulb
8. Self-zeroing burette-25 ml, graduated 0.1 divisions
9. 100 ml graduated cylinder Reagents
1. 13.5% acetic anhydride in pyridine solution. (volume ratio of 13.5:87.5)
2. 0.5N KOH in methanol. Solution must be standardized when utilizing analysis.
3. 0.1% phenolphthalein (A.C.S. reagent) in methanol as indicator.
4. Pyridine/Water (3:1 vol. ratio) solution.
5. P-Toluenesulfonic acid monohydrate (PTSA)/pyridine solution (12.35±0.1 g PTSA is added in 200 ml of pyridine).
6. Toluene (A.C.S. reagent)
7. Potassium hydrogenphthalate (KHP, acidimetric standard)
8. De-ionized water
9. Pyridine (water content <0.003%)
10. Chloroform Procedure Two samples and one blank would be set up for analysis at one time. All of steps should be operated in hood with good ventilation
1. 4±0.2 g of polyfarnesene polyol is weighed on an analytical balance to the nearest 0.1 mg and charged into a 250 ml Erlenmeyer flask.
2. Used a transfer pipette with graduation to deliver 10 ml of PTSA/Pyridine solution, which were made of 12.35±0.1 g PTSA and 200 ml pyridine, to each flask with sample and blank flask.
3. By transfer pipette 10 ml of 13.5% acetic anhydride/pyridine solution prepared from 27±1 ml of acetic anhydride and 173±1 ml pyridine are charged into each flask.
4. 25 ml chloroform was added into each flask
5. A stirring bar is added in flask, capped flask tightly to insure that reagents would not evaporate. Reagents in flask were mixed at least 5 minutes at room temperature for dissolving sample and blending solution well.
6. After mixing, the flasks were placed in oven at 60° C. for 2.5 hours.
7. Flasks were taken out of oven and cooled at room temperature about 10 min.
8. Below reagents were added in to each flask with appropriate transfer pipette or volumetric pipettes.

a. 10 ml of 75% pyridine/water solution, 25 ml toluene
b. 5 drops of indicator solution
c. 25 ml toluene 9. Each flask was recapped and the solution in the flask was stirred for 5 min at room temperature.

10. 0.5N alcoholic KOH solution as titrant was used for titration. Titrant solution was charged into self-zeroing burette.

11. Color of solution as titrated would change to light pink color when reaching end point of titration.

12. Calculation of standardization of the alcoholic KOH titrant needed to be determined by titration at every testing.

$$(W1 \times 0.9997)/(0.20423 \times S1) = N \text{(normality of KOH solution in methanol)}$$

Where W1: weight of KHP in gram
S1: volume of titrant consumed by KHP, ml
0.20423: milliequivalent weight of KHP, g/meq
0.9997: purity of KHP 13. Hydroxyl value calculation for sample:

$$[(B2-S2) \times N]/W2 = \text{hydroxyl value, meq/g}$$

Where B2: volume of titrant consumed by blank, ml
S2: volume of titrant consumed by sample, ml
N: normality of titrant, meq/ml
W2: weight of sample, g The hydroxyl value is reported to the nearest 0.001 meq/g, i.e., mmol/gram.

Viscosity Measurement

Room temperature viscosity was measured using a Brookfield DV-I+ digital viscometer with the small sample adapter. The sample was first placed in the cup of the viscometer and then the cup was positioned in the adapter sleeve by pushing it up from the bottom. Then the spindle 21 is correctly positioned in the sample. Next, the temperature bath was set to the desired temperature, i.e. 25° C. or 55° C.*0.1° C. The viscometer was run for a minimum of 30 minutes at a speed between 0.1 to 10 RPM such that the reading is between 20% and 80% of the viscometer range. After 30 minutes, the temperature readout was checked to determine that the temperature is correct and within 0.1° C. in order for the viscosity reading to be valid. If the temperature is correct, the viscosity was recorded. If temperature was not correct, it was rechecked after 15 minutes.

Mn and Mw Measurement:

Molecular weights (Mn and Mw) were measured using gel permeation chromatography (also called size exclusion chromatography or GPC) using the equipment and procedures as set out below and polystyrene standards.

GPC Equipment: Agilent 1260 Series Qegasser (Part Number G1322A), Isocratic Pump (Part Number G1310B), Autosampler (Part Number G1329B), Thermostatted Column Compartment (Part Number G1316A), Multiple Wavelength Detector (Part Number G1365C), and Refractive Index Detector (Part Number G1362A).

GPC Columns: 1× Agilent ResiPore 50×4.6 mm Guard Column (Part Number PL1513-1300) and 2× Agilent ResiPore 250×4.6 mm 3 um Particle Size Columns (Part Number PL1513-5300)

GPC Software: Cirrus 3.3, ChemStation B04.03[52]
GPC Solvent: THF Stabilized with 250 ppm BHT
GPC Flow Rate: 0.45 ml/min.
GPC Column Compartment Temperature: 40° C.
GPC Injection Volume: 5 μl
GPC Sample Preparation: Approximately 0.06 grams of sample was weighed into a vial, dissolved into 10 ml THF and then filtered through a 0.45 micron PTFE membrane. All samples were run the same day as prepared.

GPC Calibration: Agilent EasiCal® PS-2 Polystyrene Standards (Part Number PL2010-0605) and American Polymer Standards Corporation Polybutadiene Standards.

Example 1: Preparation of Hydroxyl-Terminated Polyfarnesene Using Hydrogen Peroxide Initiator Solvent: n-butanol: 106 g
Monomer: P-Farnesene: 160 g
Initiator: 30% $H_2O_2$: 38 g All compounds were charged into the reactor under a nitrogen blanket at room 3Q temperature. The reactor was pressurized at 2 bar (0.2 MPa) of $N_2$ at 25° C. The stirrer rate was set at 500 RPM. The reaction temperature was raised to 120° C., and maintained at that temperature for 4 hours. The polymer was filtered through paper filter and dried under $N_2$ blanketing at 150° C., which was maintained with an oil bath. The polymer has yellow to gold color, and has Mn=10897 g/mol; and Mw/Mn=2.424 (polystyrene calibration); and 0.56 mmol OH/gram=6.10 mol OH/mol polymer, based on the Mn.

Example 2: Preparation of Polyurethane

A polyurethane from the polymer of Example 1 was prepared according to the following procedure.

First, 24.988 gm of Example 1 polymer (=13.99 mmol OH groups) was mixed together at room temperature with 7.225 gm of 2-ethyl-1,3-hexane diol (EHD Sigma-Aldrich) which has 98.816 mmol OH groups.

Then, 14.538 gm methylene disocyanate (MDI from Sigma-Aldrich), which has 116.19 mml NCO groups was weighed out. To this, was added 1 drop of dibutyltindilaurate (DBTL). The MDI mixture was added to the polymer/polyol mixture and heated to 50° C. while stirring under a nitrogen blanketing for a few minutes. This mixture was left for 3 days (without heating) under the nitrogen blanket for full conversion of MDI. The resulting polyurethane product possessed a beige color and was quite flexible This polyurethane product was cut into 11 pieces, each weighing approximately 1.1 gms, and placed to vials with different solvents. The results in terms of swelling or not are shown in Table 1:

TABLE 1

Effect of solvents on Example 2 polyurethane

| Solvent | After 1 day | After 7 days |
|---|---|---|
| Cyclohexane | Swelled | Swelled |
| Hexane | Swelled | Swelled |
| Heptane | Swelled | Swelled |
| Benzene | Swelled | Swelled |
| Toluene | Swelled | Swelled |
| Chloroform | Swelled | Swelled |
| MTBE | Swelled | Swelled |
| Acetone | Swelled | Swelled |
| THF | Swelled | Swelled |
| Isopropanol | No change | No change |
| Methanol | No change | No change |

Beside swelling of material in solvents as indicated, the prepared polyurethane is not soluble at all these solvents.

In addition to using n-butanol as a solvent for the synthesis of hydroxyl-terminated polyfarnesene, other higher alcohols, such as iso-pentanol (Example 3) and in 1-octanol (Example 4) and t-butanol (Example 5) could serve a similar purpose. Examples 3, 4 and 5 were made using the same procedure as Example 1, but using the indicated solvents.

Note that Example 5, in t-butanol as solvent, was a 90% butadiene/10% farnesene (by weight) copolymer. The results are shown in Table 2.

TABLE 2

Results of different solvents for polymerization of farnesene.

| Type | Example | Solvent | Mn [g/mol] | Mw [g/mol] | Mw/Mn | Note |
|---|---|---|---|---|---|---|
| Polyfarnesene homopolymer | 1 | n-butanol | 10897 | 26420 | 2.424 | OH content 1.13 mmol/g |
| Polyfarnesene homopolymer | 3 | 3-methyl-1-butanol | 11727 | 31461 | 2.737 | |
| Polyfarnesene homopolymer | 4 | 1-octanol | 12678 | 39671 | 3.172 | Not well defined polymer |
| 90% butadiene 10% farnesene copolymer | 5 | t-butanol | 4486 | 10134 | 2.259 | Yield < 10% |

Note that the molecular weight distribution, Mw/Mn, broadens with increased number of carbons in the alcohol used as the reaction vehicle. The best results were achieved in n-butanol, in terms of molecular weight distribution the OH content. Polymers prepared as disclosed herein have a high OH content and are suitable for preparation of cross-linked polyurethanes. The polyurethanes prepared with the polymer of Example 1 were insoluble in all solvents tested. The swelling ratio of the polymer in each solvent was different.

In some embodiments, the invention herein can be construed as excluding any element or process that does not materially affect the basic and novel characteristics of the composition or process. Additionally, in some embodiments, the invention can be construed as excluding any element or process not specified herein.

As noted previously, although the invention is illustrated and described herein with reference to specific embodiments, the invention is not intended to be limited to the details shown. Rather, various modifications may be made in the details within the scope and range of equivalents of the claims and without departing from the invention.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A terminal hydroxyl functionalized polymeric composition, comprising polymeric molecules comprising farnesene as polymerized units in the polymeric molecules, and having an average of more than two terminal hydroxyl functional groups per polymeric molecule based on a number-average molecular weight of the polymeric molecules.

2. The terminal hydroxyl functionalized polymeric composition according to claim 1, wherein the polymeric molecules have an average of at least 2.1 terminal hydroxyl functional groups per polymeric molecule based on the number average molecular weight of the polymeric molecules.

3. The terminal hydroxyl functionalized polymeric composition according to claim 1, wherein the polymeric molecules have an average of at least 3 terminal hydroxyl functional groups per polymeric molecule based on the number average molecular weight of the polymeric molecules.

4. The terminal hydroxyl functionalized polymeric composition according to claim 1, wherein the polymeric molecules comprise an average of between 2.1 and 5 terminal hydroxyl functional groups per polymeric molecule of the polymeric molecules.

5. The terminal hydroxyl functionalized polymeric composition according to claim 1, wherein the polymeric molecules further comprise, as polymerized units, at least one comonomer selected from the group consisting of olefins, dienes, vinyl aromatics, and combinations thereof.

6. The terminal hydroxyl functionalized polymeric composition according to claim 1, wherein the polymeric molecules further comprise, as polymerized units, at least one comonomer selected from the group consisting of butadiene; isoprene; o-methyl styrene; styrene; 2,3-dimethyl butadiene; 1,3-pentadiene; 2-methyl-1,3-pentadiene; 1,3-hexadiene; 1,3-cyclohexadiene; 2-methylstyrene; 3-methylstyrene; 4-methylstyrene; 4-propyl styrene; alkyl(meth)acrylate monomers; ethylene; vinyl aromatics; fumarates; maleates; vinyl esters; acrylonitriles, and mixtures thereof.

7. The terminal hydroxyl functionalized compound according to claim 1, wherein the number average molecular weight of the polymeric molecules is from 1000 to 100,000 Da.

8. The terminal hydroxyl functionalized compound according to claim 1, wherein the number average molecular weight of the polymeric molecules is from 1000 to 15,000 Da.

9. The terminal hydroxyl functionalized compound according to claim 1, wherein the polydispersity index (Mw/Mn) of the polymeric molecules is from 1.5 to 4.

10. A method of preparing a terminal hydroxyl functionalized polymeric composition, the method comprising:
 a) mixing at least one monomer comprising farnesene, a reaction vehicle comprising a C4-C8 alcohol, and a free radical initiator comprising hydrogen peroxide to form a reaction mixture in which the free radical initiator reacts with the at least one monomer to form the terminal hydroxyl functionalized polymeric composition;
wherein the terminal hydroxyl functionalized polymeric composition comprises:
polymeric molecules comprising the farnesene as polymerized units in the polymeric molecules, and an average of more than two terminal hydroxyl groups per polymeric molecule based on the number-average molecular weight of the polymeric molecules.

11. The method according to claim 10, wherein step a) further comprises heating the reaction mixture to a temperature of 110° C. to 130° C.

12. The method according to claim 10, wherein a molar ratio of monomer to hydrogen peroxide is from 1:1 to 100:1.

13. The method according to claim 10, wherein the reaction vehicle comprises n-butanol.

14. The method according to claim 10, wherein the reaction vehicle comprises 3-methyl-1-butanol.

15. A composition for making a polyurethane comprising at least one terminal hydroxyl functionalized polymeric composition and at least one isocyanate-group containing compound,
 wherein the at least one terminal hydroxyl functionalized polymeric composition comprises polymeric molecules comprising farnesene as polymerized units in the polymeric molecules, and has an average of more than two terminal hydroxyl groups per polymeric molecule based on the number average molecular weight of the polymeric molecules;
 and wherein the at least one isocyanate-group containing compound has an isocyanate group functionality of at least two.

16. The composition according to claim 15, wherein the polymeric molecules have an average of between 2.1 and 5 terminal hydroxyl functional groups per polymeric molecule based on the number average molecular weight of the polymeric molecules.

17. The composition according to claim 15, wherein the polymeric molecules further comprise, as polymerized units, at least one comonomer selected from the group consisting of olefins, dienes, vinyl aromatics, and combinations thereof.

18. The composition according to claim 15, wherein the number average molecular weight of the polymeric molecules is from 1000 to 100,000 Da.

19. The composition according to claim 15, wherein the polydispersity index (Mw/Mn) of the polymeric molecules is from 1.5 to 4.

20. The composition according to claim 15, having an NCO/OH ratio of about 2:1 to 1:2.

* * * * *